UNITED STATES PATENT OFFICE.

VICTOR G. BLOEDE, OF CATONSVILLE, MARYLAND.

PROCESS FOR THE PRODUCTION OF ADHESIVES.

1,324,332.      Specification of Letters Patent.      Patented Dec. 9, 1919.

No Drawing.      Application filed June 19, 1918. Serial No. 240,875.

*To all whom it may concern:*

Be it known that I, VICTOR G. BLOEDE, a citizen of the United States, and a resident of Catonsville, Baltimore county, in the State of Maryland, have invented a certain new and useful Process for the Production of Adhesives, of which the following is a full, clear, and exact description.

My invention relates to the large number of products used as vegetable glues and adhesives in wood working, paper box making, the gumming of envelops and labels and other branches of industry dealing with or depending upon adhesives produced from amylaceous or starch bases by hydrolyzation or other chemical treatments.

It has long been a recognized fact among those skilled in the art of manufacturing these adhesives that certain starches produce better results than others, and that there is a vast difference in the adhesive properties as well as appearance and other physical properties of the various species of starch when converted into dextrin, vegetable glue, gums or other products forming the large line now being used as adhesives in various branches of industry.

In the manufacture of what is known as vegetable glue, generally produced by the action of an alkali upon amylaceous matter, it has been found that tapioca, or cassava starch, gives results very much superior to most, if not all, other species of starch; while in the manufacture of highly soluble dextrin, potato starch is considered the best.

Owing to the gradual elimination of the foreign made starches, from the markets of the world, as a result of the world war, many efforts have been made to find some method or process by which our domestic corn starch, which is, or can be produced in practically unlimited quantities, can be successfully substituted for tapioca, potato, sago and other starches of foreign production upon which our industries have heretofore been dependent.

While it has been held, and is probably true, that corn starch cannot be so treated or manipulated as to make it a substitute for all purposes that the foreign starches named are employed, I have discovered a method by which I can so greatly improve the adhesive properties and working qualities of corn starch as to make it an entirely satisfactory substitute in many branches of industry for the higher grades of starch.

By my new process I am able to produce vegetable glues, which in the wood working industry, and for other purposes in which powerful adhesives are required of sufficient strength, using corn starch as a base, to be a satisfactory substitute for animal glue, and equal in working qualities and results to the vegetable glues heretofore produced from tapioca starch.

So far as I am aware, there never has been a satisfactory explanation of the exact nature of the difference between corn starch and tapioca, potato or other starches, that is to say, whether the great differences known to exist between these starches is structural or chemical, although we do know, in a general way, that there is a vast difference in their physical properties as shown by the results obtained by hydrolyzation and other chemical or physical treatments. The cause of this difference is by no means clear.

For instance, when corn starch is boiled to a paste with water, it produces a white, or only semi-transparent composition rather lumpy and short of what technically is called "fiber," and possessing comparatively limited adhesive properties. The same is true of corn starch when treated with caustic soda for the production of a vegetable glue, the result being a short, or choppy composition of somewhat milky appearance, while high grade tapioca starch under the same treatment yields a clear and very cohesive or "rubbery" jelly possessing very high adhesive qualities.

In the manufacture of dextrin and other hydrolyzed products, corn starch shows the same disadvantages, even in a higher degree. Dextrins made from corn starch produce a muddy solution inferior in color, adhesiveness and gloss, and for this reason corn starch has never become a competitor of, or substitute for the superior grades of dextrins obtainable from tapioca or potato starch.

As previously stated, no one up to the present time seems to have been able to give a satisfactory explanation as to the cause of the inferiority of corn starch. It is known that this product frequently contains a not inconsiderable quantity of oil or fatty matter, as well as certain albuminous, or nitrogenous impurities, all of which no doubt have some effect in the determination of the quality and character of the final product produced from it by hydrolyzation, or other chemical treatment.

Whatever the cause of the acknowledged inferiority of corn starch may be, I have discovered a simple method of improving its quality to such a marked degree that while it could not be said that I have perfected a complete substitute for tapioca, or other high grade starches for all purposes, it is nevertheless a fact that by my process of treatment, the inherent adhesive properties of corn starch as well as other desirable physical properties, are so vastly increased that in the large majority of cases the products I am able to obtain from corn starch by my process will take the place of those made from the so-called higher grades of starch for many industrial purposes, thereby conferring a great boon upon many large manufacturing industries heretofore wholly dependent upon foreign materials for their supply.

My process is a very simple one, and consists, as a preliminary step, in the production of a base suitable for conversion into vegetable glue, or dextrins, in heating corn starch to a certain temperature for a varying time, according to the qualities desired in the final product.

Owing to the fact stated that the exact chemistry of the various substances entering into the composition of the ordinary commercial corn starch is not understood, I can venture no theory as to the cause of the improvement I am able to effect by my treatment, but it is my opinion that it is due to the splitting up, or elimination of the deleterious matter by the heat employed. For instance, it may be assumed that any oil or fatty matter present in the corn starch treated by my method would be largely modified, if not entirely eliminated; also that albuminous substances present incapable of withstanding a comparatively high temperature might be decomposed or modified, but whatever the nature of the change, or the chemical or physical process involved may be, it is a fact that by a simple preliminary heating to a given range of temperature for a certain length of time, the corn starch can be so vastly improved for subsequent employment in the production of vegetable glue or dextrin, through the modification brought about by my process, as to make it a close competitor of tapioca starch in the art of manufacturing adhesives.

Having now fully described the object and nature of my invention, I will give a detailed description of the manner in which I carry out the process in practice.

The apparatus which I employ consists preferably of a cylinder, or pan, provided with mechanical agitators, which will keep every portion of the starch in constant motion during the heating process. The cylinder, or pan, in which the heating is effected is supplied with gas jets burning a blue flame, and so adjusted and apportioned as to heat the entire cylinder, or pan, to a uniform temperature quickly. The use of gas of course is not essential, as coal or oil heating may be substituted, or a double cylinder may be used, the outer jacket of which is filled with paraffin, as in some of the old systems of dextrinizing starches. I do not therefore confine myself to gas as a heating agent, although I have found it the most satisfactory in practice. As an alternative to the apparatus described the corn starch may be placed on pans or trays in thin layers and exposed to the necessary heat in a drying room.

In an apparatus such as described I place, say five hundred pounds of corn starch, or other starch to be operated upon for the production of my base, and having started the agitator I raise the heat within the body of the material in the mixer to a temperature approximately between 300 and 400 degrees F. and maintain this temperature for approximately from thirty minutes to one hour according to the quality and character of the final product desired, and upon completion of the operation the starch so processed is removed from the apparatus and cooled as rapidly as possible. There is scarcely any change in the appearance or physical properties apparent in the starch after this treatment, excepting a slight yellowing of the color. As distinct from a British gum, or hydrolyzed starch, my product remains entirely insoluble in cold water, and acts just the same as a raw starch when brought in contact with it. The product so obtained and described forms the base for the subsequent production of vegetable glue and dextrin.

For the production of vegetable glue, my base is treated with caustic alkali by any of the several methods now in use for the production of vegetable glue from tapioca starch. For the production of high grade dextrins, I allow the base to stand over until entirely cold, or preferably until the material has become rehydrated by the absorption of moisture from the atmosphere, that is to say, until the natural moisture which has been expelled by the heating operation has been replaced. This modified starch is then placed in an agitator, or other convenient mixing device such as is generally employed in the production of dextrin, and a small percentage of acid, or other hydrolyzing agent, is added, after which the composition is reheated until the desired degree of hydrolyzation has been effected. In other words, my refined or base starch is treated for hydrolyzation processes, exactly as if it were the raw or unrefined material. The results of the hydrolyzation of a starch prepared by my process are vastly superior to the product obtained from the raw starch. The adhesive power is immensely increased and the physical or working properties greatly improved, while color and clearness is a marked improvement over any hydrolyzed product that can be obtained from a raw or untreated starch.

In the preceding specification, I have dwelt especially upon the treatment of corn starch by my method of preparing a suitable base, but simply because corn starch is at the present time the only available material made in the United States which can form a substitute for the foreign starches. I have found, however, that when tapioca starch is subjected to the same treatment, it is likewise improved for many purposes. It has been found that especially the lower grades of tapioca starch, as well as sago and potato starch, may be advantageously treated by my method when these products are available. I do not therefore confine myself to the use of any particular starch in the preparation of my new basic product designed for subsequent secondary process for conversion into vegetable glues or dextrin.

I am aware that the production of British gum by the roasting or torrefication of starch has been known and in use for many years, but my new product as well as process is wholly different from the material known as British gum in that the heat used in the production of the latter is higher as well as much more prolonged. The object sought being to render the starch largely or wholly soluble in warm or cold water, that is to say, to dextrinize the starch, a condition which would be fatal to my product, and render it mechanically unfit for subsequent hydrolyzation by the usual methods employed, nor could a largely dextrinized starch be used successfully in the production of vegetable glues, owing to loss of body, and other physical changes in the material.

The difference between my process and the conversion of the starch into British gum is therefore self-evident, it being necessary in my process to so regulate the heat as to maintain the starch in unconverted condition, that is, wholly—or practically wholly—insoluble in cold water.

My process is not designed to produce a finished product, but simply a refined starch, or starch base which through the treatment of raw starch in the manner I have described produces a material which upon a secondary treatment such as is now generally employed in the production of vegetable glue and dextrin yields products far superior both in adhesive qualities and in working properties to the raw or unrefined starches now generally employed in the manufacture of adhesives.

What I claim is:

1. The process herein described for the production of a refined or modified starch, or starch base, consisting in heating raw starch to a temperature approximately between 300 and 400 degrees F. for approximately, from thirty minutes to one hour according to the purpose for which the product is to be subsequently used, so regulating the temperature and time of the heat exposure that the starch at the end of the operation still remains practically insoluble in cold water.

2. The process herein described for the production of modified starch, or a starch base, consisting in heating raw starch to a temperature approximately between 300 and 400 degrees F., for approximately from thirty minutes to one hour, the temperature and time of heat exposure being so regulated that the starch at the end of the operation still remains practically insoluble in cold water, thereby producing a new starch base which upon subsequent manipulation with chemical agents yields adhesive products superior to those obtainable from raw or untreated starch.

VICTOR G. BLOEDE.

Witnesses:
Wm. H. Thomas,
Sadie E. Figg.